United States Patent
Rutelin et al.

(10) Patent No.: US 12,447,923 B2
(45) Date of Patent: Oct. 21, 2025

(54) HANDLING EXCURSION FAR-SIDE LOAD CASES WITHOUT USE OF A TUNNEL CONSOLE

(71) Applicant: Volvo Car Corporation, Gothenburg (SE)

(72) Inventors: Sebastian Rutelin, Gothenburg (SE); John Eriksson, Gothenburg (SE); Michaela Kjellander, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/937,766

(22) Filed: Nov. 5, 2024

(65) Prior Publication Data
US 2025/0162533 A1    May 22, 2025

(30) Foreign Application Priority Data
Nov. 21, 2023   (EP) .................................... 23211285

(51) Int. Cl.
*B60R 21/231*    (2011.01)

(52) U.S. Cl.
CPC .................. *B60R 21/23138* (2013.01); *B60R 2021/23107* (2013.01); *B60R 2021/23146* (2013.01)

(58) Field of Classification Search
CPC ............ B60R 21/207; B60R 21/23138; B60R 2021/23382
See application file for complete search history.

(56) References Cited

U.S. PATENT DOCUMENTS

| | | | |
|---|---|---|---|
| 6,832,778 B2 * | 12/2004 | Pinsenschaum | B60R 21/2338 280/739 |
| 8,882,138 B1 * | 11/2014 | Hicken | B60R 21/231 280/730.2 |
| 9,227,587 B1 * | 1/2016 | Belwafa | B60R 21/205 |
| 9,233,661 B2 * | 1/2016 | Yamanaka | B60R 21/18 |
| 9,550,469 B2 | 1/2017 | Sato et al. | |
| 9,566,929 B1 * | 2/2017 | Belwafa | B60R 21/23138 |
| 9,796,354 B1 | 10/2017 | Hayashi et al. | |
| 9,815,428 B2 * | 11/2017 | Anderson | B60R 21/2338 |
| 10,308,207 B2 * | 6/2019 | Ohno | B60R 21/233 |
| 10,358,106 B2 | 7/2019 | Sumiya et al. | |
| 10,407,015 B2 * | 9/2019 | Belwafa | B60R 21/207 |
| 10,457,234 B2 | 10/2019 | Ohno et al. | |
| 10,471,919 B2 * | 11/2019 | Faruque | B60R 21/205 |

OTHER PUBLICATIONS

Extended European Search Report received for European Application Serial No. 23211285.4 dated May 13, 2024, 6 pages.

\* cited by examiner

*Primary Examiner* — Faye M Fleming
(74) *Attorney, Agent, or Firm* — Amin, Turocy & Watson, LLP (57) ABSTRACT

The disclosure relates to handling excursion far-side load cases without use of a tunnel console. A corresponding airbag arrangement for a vehicle can comprise a driver area and a passenger area. The airbag arrangement can comprise a first airbag configured to inflate in the passenger area. The airbag arrangement can further comprise a second airbag configured to inflate between an inboard side of the driver area and the inflated first airbag, such that when the first airbag and the second airbag are inflated the first airbag provides support for the second airbag such that the first airbag inhibits a movement of the second airbag into the passenger area.

20 Claims, 10 Drawing Sheets

HANDLING EXCURSION FAR-SIDE LOAD CASES WITHOUT USE OF A TUNNEL CONSOLE

CROSS REFERENCE TO RELATED APPLICATIONS

This application claims the benefit of and priority to pending EP patent application Ser. No. 23/211,285.4, filed Nov. 21, 2023, and entitled "A METHOD AND APPARATUS FOR HANDLING EXCURSION FAR-SIDE LOAD CASES WITHOUT USE OF A TUNNEL CONSOLE," the entirety of which is hereby incorporated by reference herein.

TECHNICAL FIELD

The present disclosure relates to airbags and, more particularly, to airbags used in conjunction with vehicles.

BACKGROUND

Airbags are an essential part of vehicle safety systems. A vehicle safety system can include a sensor to detect when a vehicle has experienced a crash event or collision. The vehicle safety system can determine whether the crash event is a front-end crash event, a far-side crash event, or any other category of crash event, based on sensor data. Once a crash event has been detected, the vehicle safety system can deploy one or more airbags, such as a driver airbag and/or a passenger airbag, depending on the type of crash event.

The background section relating to airbags in vehicle safety systems is merely intended to provide a contextual overview and is not intended to be exhaustive. Other contextual information may become apparent to a person of skill in the art upon review of the following detailed description.

SUMMARY

Vehicle safety systems can comprise one or more airbags to reduce the risk of injury to the driver and/or passengers of the vehicle. Frontal airbags, such as a driver airbag and a front passenger airbag can be frontal airbags located in front of the occupants, such as the vehicle dashboard, and are activated and/or inflated in response to determination of a front-end crash event. Vehicle safety systems can further comprise side airbags located on the outboard and inboard sides of a vehicle occupant and are activated and/or inflated in response to a lateral crash event, such as a near-side and/or a far-side crash event.

The inboard of a vehicle is the area toward a center line of the vehicle, where the center line runs between the front and rear of the vehicle. Therefore, in the front area of a vehicle the inboard side is the area between a driver area and a passenger area of the vehicle.

Near-side and far-side crash events can be distinguished by resulting trajectory of a vehicle occupant. For example, a vehicle driver would have an outboard trajectory (towards the driver door) in a near-side crash event and inboard trajectory (towards a vehicle center) in far-side crash event. It is understood by a person of skill in the art that the terms far-side crash event and near-side crash event are relative to the vehicle occupant. For example, a near-side crash event for a driver would be a far-side crash event for a front passenger. For the purpose of this disclosure, a far-side crash event will mean a far-side crash event from the perspective of the driver such that the point of contact of the vehicle in a crash event may be a passenger side of the vehicle.

Far-side crash events, include the risk of a head-to-head interaction between a driver and a passenger. An additional risk includes driver excursion when there is no front passenger in the vehicle. Excursion occurs when there is nothing to prevent the driver from a lateral trajectory into a passenger area of the vehicle, which may result in injury to the driver. An inboard side airbag can reduce and/or prevent injury to the driver and/or front passenger during lateral crash events.

An inboard side airbag is commonly positioned in the inboard side of a driver seat. The inboard side airbag can be configured to reduce the risk of head-to-head contact between a driver and a passenger and/or excursion of a driver. A vital part of preventing driver excursion is to provide support for the inboard side airbag from a vehicle's tunnel console.

However, there is a trend within the automotive industry to reduce the size of or eliminate tunnel consoles in vehicles. Therefore, it would be desirable in the field of vehicle safety to provide an alternative support for the inboard side airbag to prevent driver excursion in the event of a far-side crash event when there is not a front passenger in the vehicle.

According to an embodiment, an airbag arrangement for a vehicle can comprise a driver area and a passenger area, the airbag arrangement can comprise a first airbag configured to inflate in the passenger area; a second airbag configured to inflate between an inboard side of the driver area and the inflated first airbag, such that when the first airbag and the second airbag are inflated the first airbag provides support for the second airbag such that the first airbag inhibits a movement of the second airbag into the passenger area. Inflating the first airbag to provide support for the second airbag reduces or prevents driver excursion in the event of a far-side crash event.

Vehicles without a tunnel console require other means of providing support for the inboard side airbag. Providing support for an inboard side airbag with a passenger side airbag prevents or reduces excursion during far-side crash events in vehicles without a tunnel console. As a result, the airbag arrangement reduces the risk of injury to a driver in far-side crash events without a front passenger in the vehicle. Therefore, the airbag arrangement no longer requires a tunnel console to provide support for an inboard side airbag in far-side crash events.

The first airbag and the second airbag can comprise an inflator configured to provide gas to inflate the first and second airbags. The inflator can be activated in response to a crash event to inflate the first and second airbags. A person of skill in the art would understand that any means of inflating airbags can be present in the disclosed airbag arrangement.

According to an embodiment, the first airbag can be installed in a dashboard of the vehicle. Installing the first airbag in the dashboard enables the first airbag to deploy from the dashboard and extend toward a passenger seat in a passenger area of the vehicle.

According to an embodiment, the second airbag can be installed in an inboard side of a driver seat. Installing the second airbag on the inboard side of a driver seat enables a vehicle to comprise an inboard side airbag for vehicles without a tunnel console. Additionally, installing the second airbag on the inboard side of the driver seat enables the second airbag to inflate in an inboard area of the vehicle.

According to an embodiment, the first airbag can comprise at least one strap and can be configured to inflate to a first size or a second size, wherein the second size is longer than the first size. The first airbag being configured to inflate to two different volumes or sizes enables a single airbag to adapt to different scenarios. For example, the first airbag can inflate to a first size when a passenger occupies the passenger area of the vehicle, or can inflate to a longer second size when there is not a passenger in the passenger area. For example, the second size can extend to a longer length as compared to the first size, and extend from the vehicle dashboard to a seatback of the passenger seat to provide support for an inboard airbag.

According to an embodiment, the first airbag can comprise at least one strap and can be configured to inflate to a first volume or a second volume, wherein the second volume is greater than the first volume. The first airbag can be configured to inflate to two different volumes enables a single airbag to adapt to different scenarios. For example, the second volume can be greater than the first volume to substantially fill the passenger area when there is not a front passenger in the vehicle.

According to an embodiment, the at least one strap can be configured to release such that the first airbag inflates to the second size. The first airbag can comprise a fastener configured to break or move upon activation. Upon breaking or moving, the fastener can release the at least one strap such that the strap extends to a longer length as compared to when the fastener is intact or in place. The released strap enables the first airbag to inflate to the second size such that the first airbag provides support for the second airbag.

According to an embodiment, the at least one strap can be configured to tear, such that the first airbag inflates to the second volume or size. The strap can be configured to tear in the absence of a passenger to enable the airbag to inflate to the larger size, such that a sufficient portion of the passenger area is occupied by the first airbag to provide support for the second airbag.

According to an embodiment, the at least one strap can be configured to tear pyrotechnically. A pyrotechnic cutter can be installed on the at least one strap. The pyrotechnic cutter can be activated in the scenario in which a passenger is not in the vehicle. The pyrotechnic cutter can use energetic materials, which when ignited, can release energy to force a cutting blade to sever the at least one strap. The first airbag can inflate to the larger size when the one or more straps are torn.

According to an embodiment, the first airbag can be configured to inflate before the second airbag during a crash event. Inflating the first airbag before inflating the second airbag can ensure that the first airbag is in place to support the second airbag as the second airbag inflates.

According to an embodiment, the airbag arrangement can be configured to inhibit movement of a vehicle driver from the driver area to the passenger area when the first airbag and the second airbag are inflated. Supporting the second airbag with the first airbag can prevent or inhibit movement of the second airbag into the passenger area. Therefore, reducing the risk or preventing excursion of the driver and reducing or preventing injury to a driver in a far-side crash event.

According to an embodiment, an airbag system comprising the previously described airbag arrangement can further comprise a first sensor configured to detect a passenger in the passenger area; a second sensor configured to detect a crash event; a controller configured to inflate the first airbag and inflate the second airbag in response to the detection of the crash event and the detection of the passenger.

A vehicle can be equipped with sensors, such as one or more weight sensors, configured to detect a passenger in the passenger seat. The controller can be configured to adapt to the presence or absence of a passenger in the vehicle based on the output of the one or more sensors. Other types of sensors can also be configured to detect a passenger. For example, cameras, radars, belt sensors, or any combination of sensors can be configured to detect a passenger.

A vehicle can be equipped with sensors, such as one or more crash sensors, configured to detect a crash event. The controller can be configured to adapt to the type of crash event detected such as a front-end crash event or far-side crash event.

According to an embodiment, the controller can comprise a processor, wherein the processor receives a first output from the first sensor and a second output from a second sensor. The controller can be configured to process the output signal of the first sensor and/or the output signal of the second sensor and generate a command to deploy the airbag arrangement based on the first output signal and the second output signal.

According to an embodiment, the processor can be configured to determine an absence of the passenger based on the first output and the controller can be further configured to inflate the first airbag and inflate the second airbag in response the determination of the absence of the passenger. Determining whether a front passenger is present enables the controller to adapt the size of the first airbag based on the determination. When a passenger is present, the first airbag should be inflated to a smaller first size. When a passenger is not present, the first airbag should be inflated to a larger second size to provide support for the second airbag.

According to an embodiment, the processor can be configured to determine that the crash event is a far-side crash event based on the second output and the controller can be further configured to inflate the first airbag and inflate the second airbag in response the determination of the far-side crash event. Determining a far-side crash event enables the controller to adapt whether to deploy the first airbag. For example, the controller may not deploy the second airbag in response to determining a front-end crash event. As another example, the controller can inflate the second airbag and inflate the first airbag to its second size in response to determining a far-side crash event and determining that a passenger is absent.

The processor of the controller can be configured to determine whether a passenger, such as a front passenger, is present based on a first sensor output signal. The processor of the controller can be further configured to determine a far-side crash event based on a second sensor output signal. The controller can be configured to activate the pyrotechnic cutter in response to the determination that a passenger is not present and that the crash event is a far-side crash event. This enables the first airbag to inflate to a second size from the dashboard to the seatback of a passenger seat.

According to an embodiment, the one or more straps can be configured to tear or release in the absence of a passenger, and the first airbag can be configured to inflate to the second volume to extend from a vehicle dashboard to a passenger seat back. Inflating the first airbag from the dashboard of the vehicle to the passenger seat back provides a surface of the first airbag which is sufficient to provide support for the second airbag such that the first airbag prevents the second airbag from moving into the passenger area.

According to an embodiment, the one or more straps can be configured to tear mechanically. The straps can be configured to tear in the absence of a passenger. In the presence of a passenger, the first airbag can encounter resistance from the body of the passenger as it inflates. The resistance can prevent the straps from tearing. Additionally, or alternatively, in the absence of a passenger the first airbag will not encounter resistance, and the straps will tear such that the first airbag inflates to a second volume such that the first airbag extends from the dashboard to the passenger seat back.

According to an embodiment, the inboard side of the driver area does not overlap with the passenger area. Configuring the first airbag to inflate in a passenger area and the second airbag to inflate in an inboard area without any overlap can prevent the first airbag and second airbag from interfering with each other as they inflate. Additionally, the controller can inflate the first airbag and second airbag simultaneously or concurrently without them interfering with each other.

According to an embodiment, the first output can comprise weight information for a passenger seat. The processor can be configured to receive the weight information from one or more weight sensors to determine if a passenger is present in the vehicle.

According to an embodiment, the second output can comprise force information for a crash event. The force information can comprise a magnitude and a direction of the force. The processor can be configured to receive the force information from one or more crash sensors and determine if the crash event is a far-side crash event and if the force is large enough to deploy the airbag arrangement.

According to an embodiment, a method of preventing a vehicle driver from moving into a passenger are of a vehicle during a crash event the method can comprise inflating a first airbag in a passenger area of the vehicle; and inflating a second airbag in an inboard area of the vehicle, wherein the inboard area is between a driver area and the passenger area of the vehicle. Inflating the first and second airbags fills the far-side space in the vehicle relative to the vehicle driver such that the airbags prevent the vehicle driver from moving into the far-side space or passenger area.

BRIEF DESCRIPTION OF DRAWINGS

Examples of the disclosure will be described in the following with reference to the following drawings.

DETAILED DESCRIPTION

The present disclosure is directed to an airbag arrangement of a vehicle comprising a first airbag and a second airbag. The first airbag can be configured to inflate in a passenger area of the vehicle and the second airbag can be configured to inflate in an inboard area of the vehicle such that first airbag prevents the second airbag from moving into the passenger area of the vehicle. The airbag arrangement can be deployed during a far-side load crash event to prevent far-side excursion of a vehicle driver.

Figure 1:
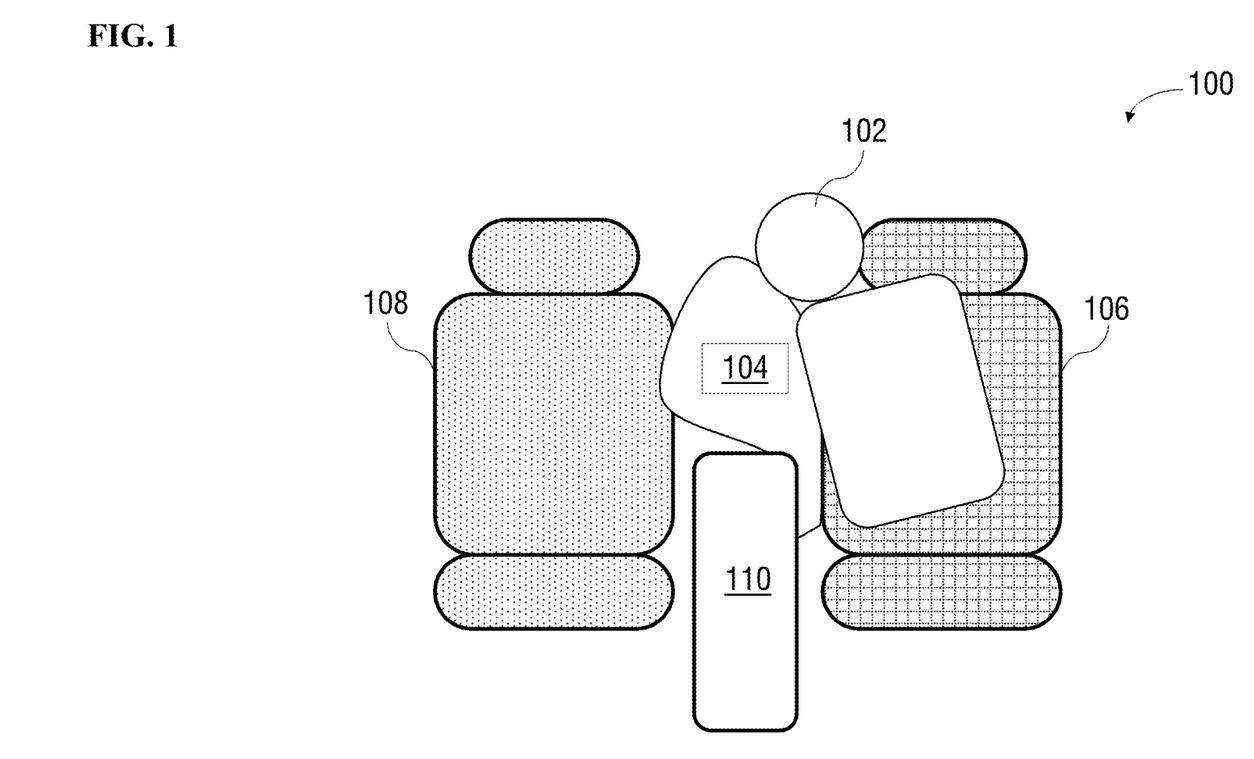
FIG. 1 illustrates a front view of a vehicle interior during a far-side crash event according to at least one example of the disclosure.

FIG. 1 is a front view of vehicle interior 100 during a far-side crash event. Vehicle interior 100 can comprise driver seat 106, passenger seat 108, tunnel console 110, and inboard airbag 104. Vehicle driver 102 can occupy driver seat 106.

During a far-side crash event, an airbag system of the vehicle can be configured to deploy inboard airbag 104 to prevent far-side excursion of vehicle driver 102. Inboard airbag 104 can be installed in tunnel console 110. Tunnel console 110 can provide inboard airbag 104 with support to prevent vehicle driver 102 from moving into a passenger area of the vehicle. The forces of a far-side load crash event can move vehicle driver 102 toward the passenger area of the vehicle. Tunnel console 110 can provide support to inboard airbag 104 such that, when vehicle driver 102 makes contact with inboard airbag 104 during a far-side crash event, vehicle driver 102 does not move into the passenger area of the vehicle.

Figure 2:
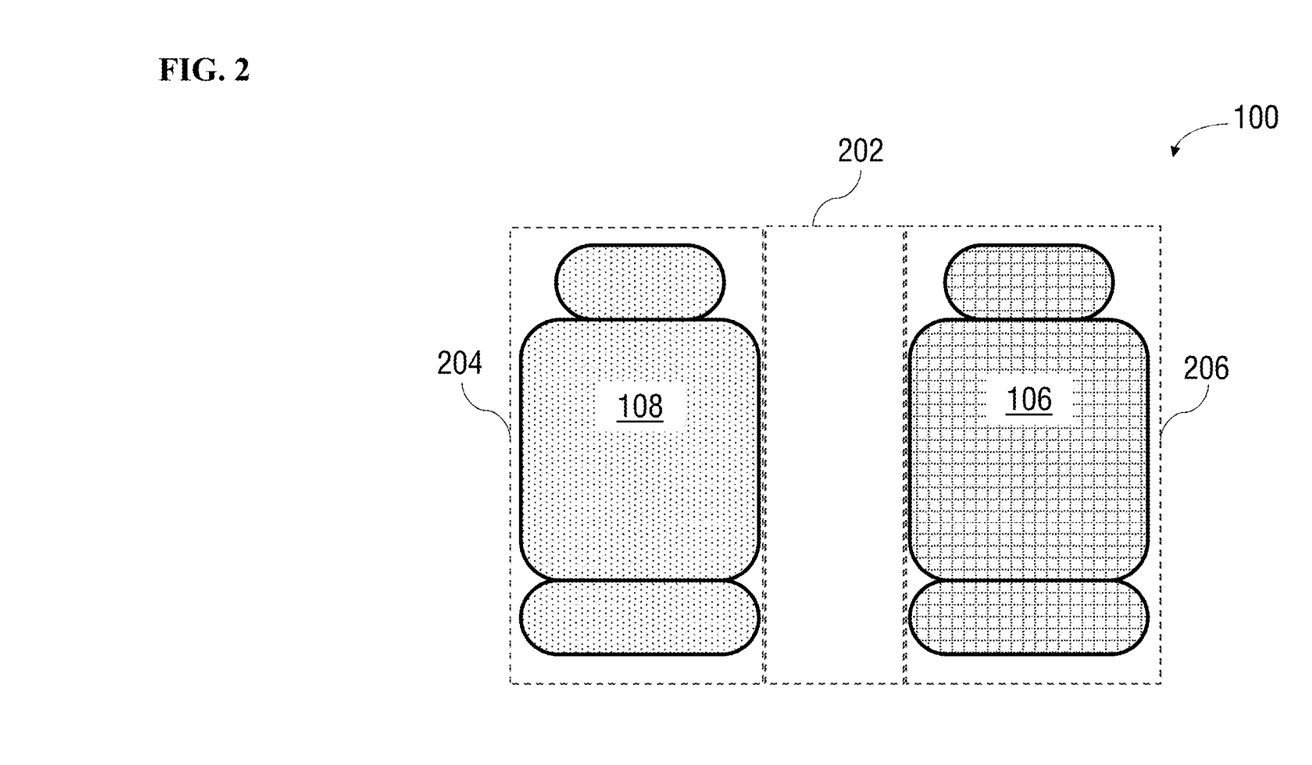
FIG. 2 illustrates a front view of a vehicle interior without a tunnel console according to at least one example of the disclosure.

FIG. 2 is a front view of vehicle interior 100 without a tunnel console. The front area of the vehicle interior 100 can comprise inboard side 202, passenger area 204, and driver area 206. Passenger area 204 can comprise passenger seat 108. Driver area 206 can comprise driver seat 106. Inboard side 202 can comprise the space between driver seat 106 and passenger seat 108. Inboard side 202 can be centered around a center line of a vehicle. Vehicle interior 100 without a tunnel console can require alternative support for inboard airbag 104.

Figure 3:
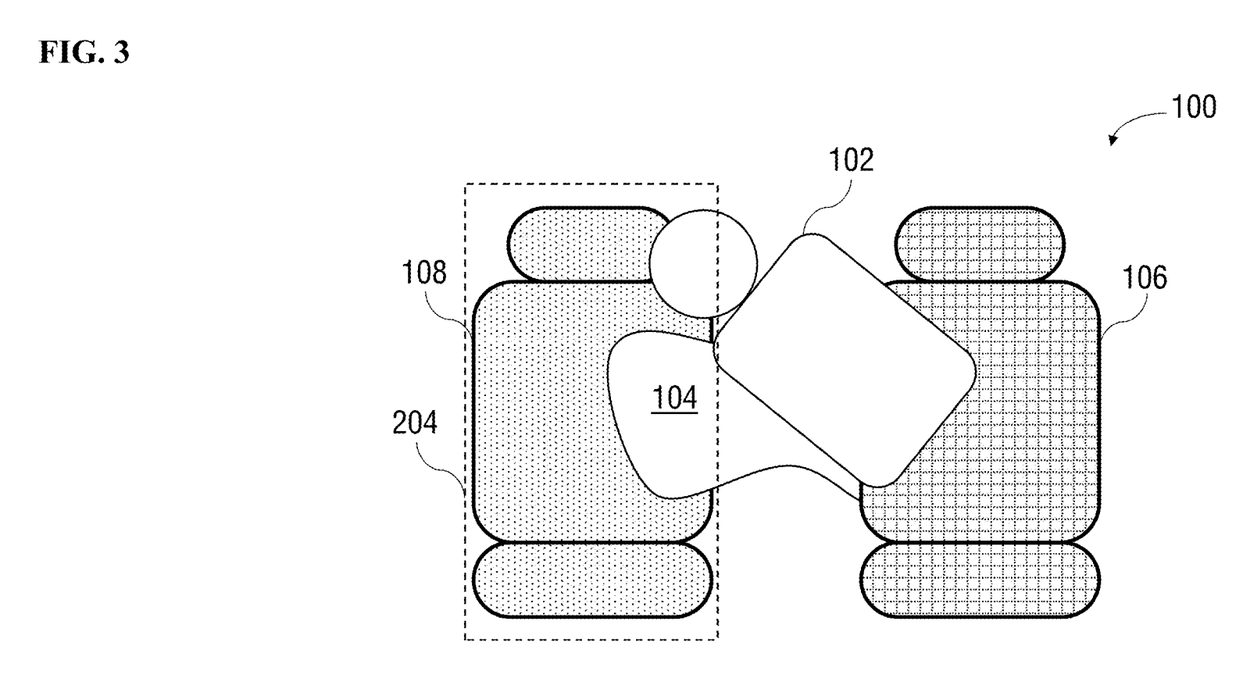
FIG. 3 illustrates a front view of vehicle interior without a tunnel console during a far-side crash event according to at least one example of the disclosure.

FIG. 3 is a front view of vehicle interior 100 without a tunnel console during a far-side crash event. Inboard airbag 104 can be installed on an inboard side of driver seat 106. During a far-side crash event an airbag system of the vehicle can deploy and inflate inboard airbag 104. Without a tunnel console or a passenger in passenger seat 108, the only support for inboard airbag 104 can be driver seat 106. This may not be sufficient support to prevent excursion of vehicle driver 102 during a far-side crash event. As shown in FIG. 3, driver 102 is in contact with inboard airbag 104 during the crash event. Without additional support for inboard airbag 104, vehicle driver 102, and/or inboard airbag 104 can move into passenger area 204. During such an event, driver 102 can experience a far-side excursion event and suffer an injury.

Figure 4A:
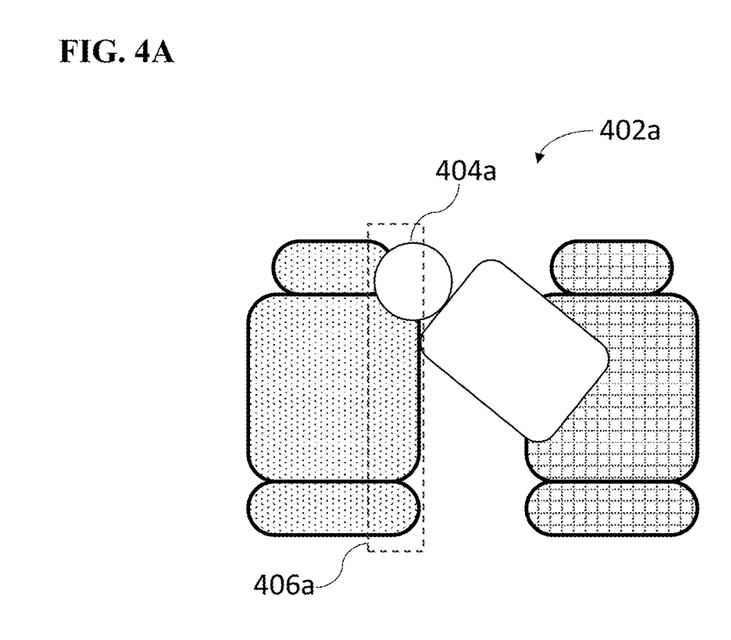
FIGS. 4A and 4B illustrate front views of a vehicle driver experiencing a far-side excursion according to at least one example of the disclosure.
Figure 4B:
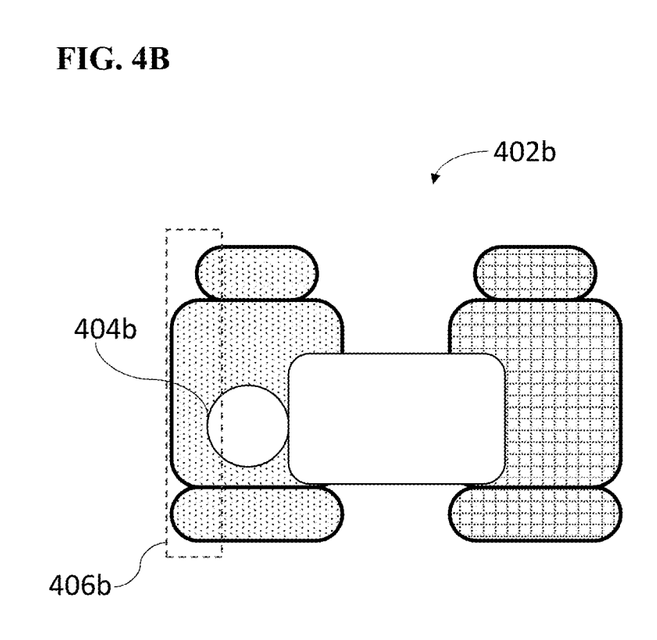

FIGS. 4A and 4B are front views of vehicle driver experiences of a far-side excursion event. FIG. 4A is a front view of minor excursion event 402a. In excursion event 402a, driver head 404a moves into space 406a of the passenger area. Excursion of a vehicle driver may not be completely preventable and FIG. 4A can depict an acceptable amount of excursion. FIG. 4B is a front view of a major excursion event 402b. In excursion event 402b driver head 404b moves into space 406b of the passenger area. Both excursion event 402*a* and excursion event 402*b* pose a risk of injury to a vehicle driver. The greater the excursion event, the greater the risk of injury to the vehicle driver. For example, excursion event 402*b* poses a greater risk of injury as compared to excursion event 402*a*. Preventing or reducing excursion of the vehicle driver reduces the risk of injury to the vehicle driver.

Figure 5:
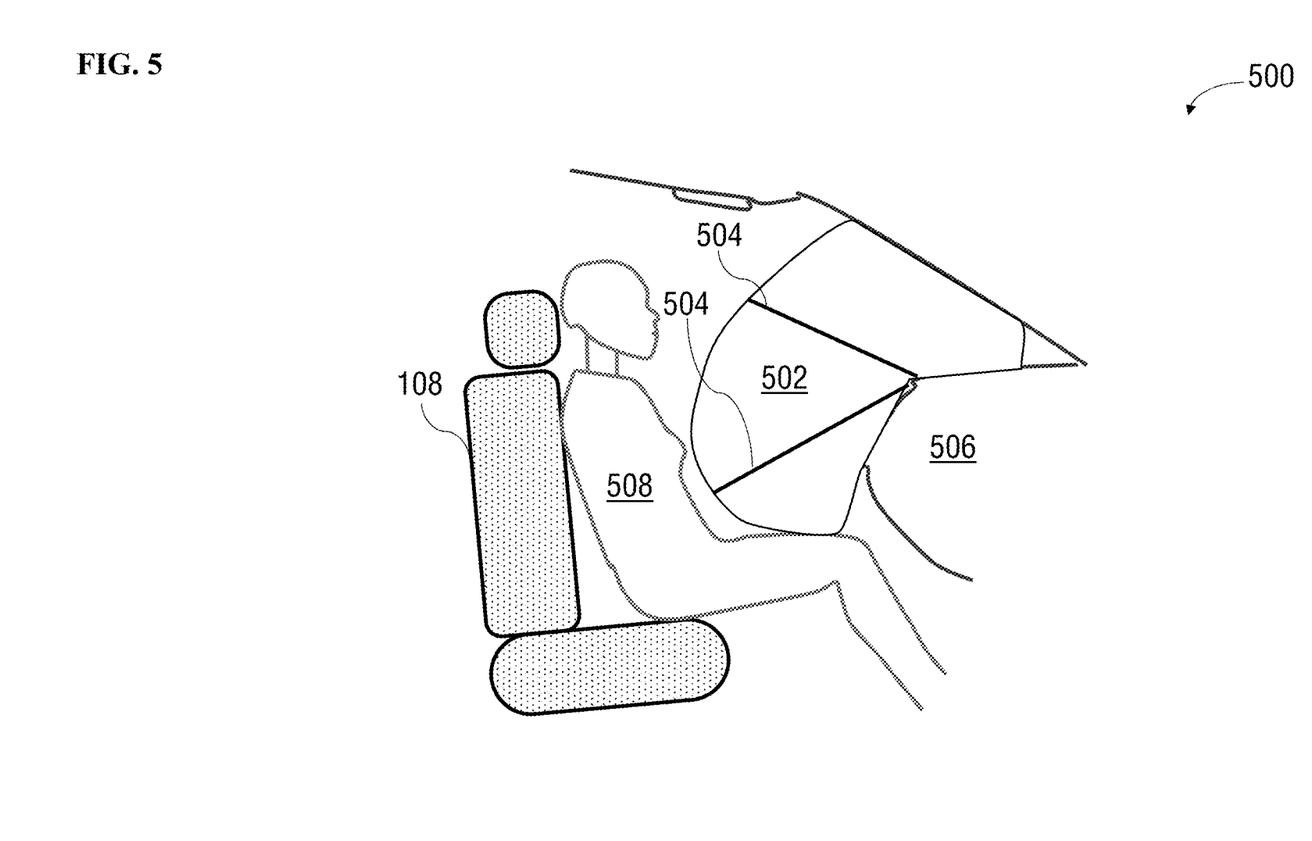
FIG. 5 illustrates a passenger side view of a vehicle interior according to at least one example of the disclosure.

FIG. 5 is a passenger side view of vehicle interior 500. Vehicle interior 500 can comprise passenger airbag 502, vehicle dashboard 506, and passenger seat 108. Passenger airbag 502 can comprise one or more straps 504. Passenger 508 can occupy passenger seat 108.

Passenger airbag 502 can be configured to deploy and inflate in response to a crash event to protect passenger 508 from injury. For example, during a front-end crash event, passenger 508 may move toward dashboard 506 and passenger airbag 502 can inflate between passenger 508 and dashboard 506 to prevent passenger 508 from hitting dashboard 506.

During a front-end crash event where passenger 508 occupies passenger seat 108, passenger airbag can extend from dashboard 506 to passenger 508. During a front-end crash event, one or more straps 504 can stay intact to inflate airbag 502 to a desired size, shape, and volume. The desired size, shape, and volume can be configured to protect passenger 508 from injury during a front-end crash event.

Figure 6:
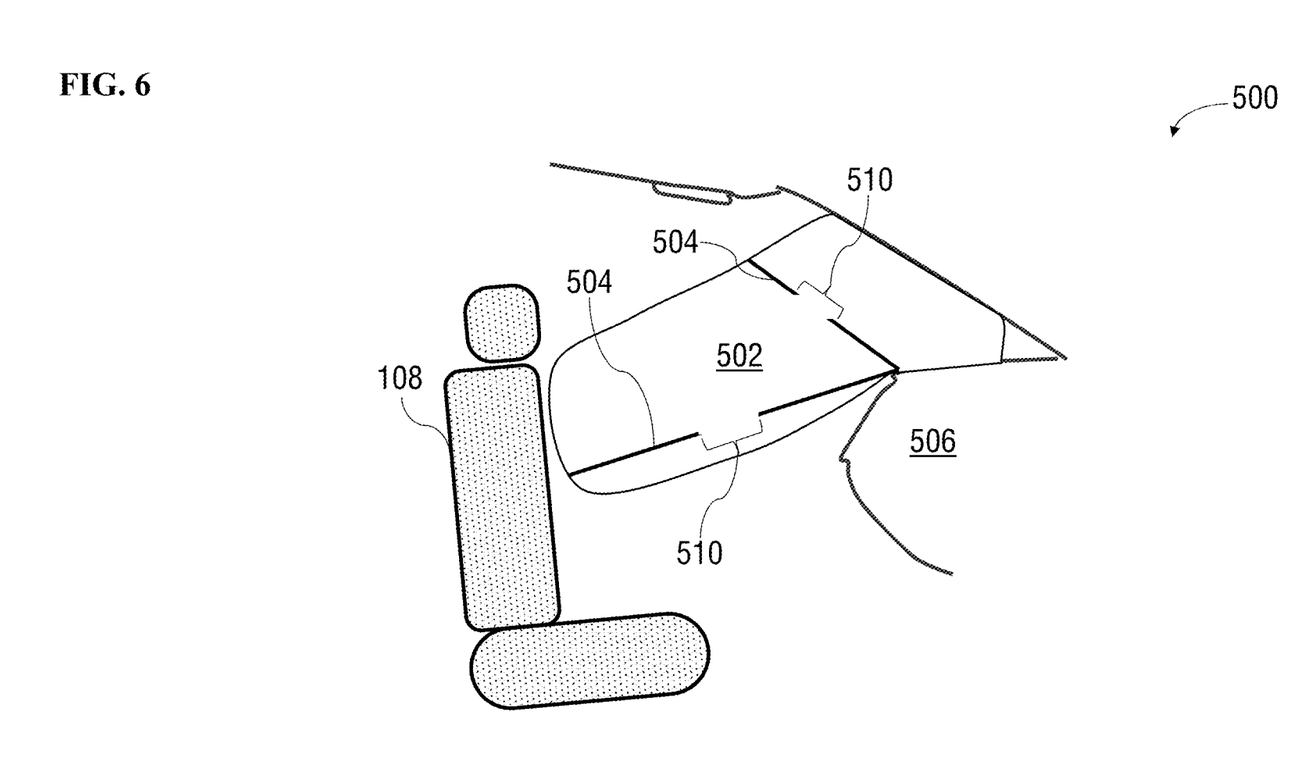
FIG. 6 illustrates a passenger side view of a vehicle interior according to at least one example of the disclosure.

FIG. 6 is a passenger side view of vehicle interior 500. Passenger seat 108 can be unoccupied. Passenger airbag 502 can be configured to deploy and inflate in response to a crash event to provide support for an inboard airbag. For example, during a far-side crash event in which passenger seat 108 is unoccupied, passenger airbag 502 can inflate between a seat back of passenger seat 108 and dashboard 506 to provide sufficient support to an inboard airbag. Together, the inboard airbag and passenger airbag 502 can prevent far-side excursion of a vehicle driver.

One or more straps 504 can be configured to tear or extend in response to a far-side crash event. One or more straps 504 can be configured to tear in response to the far-side crash event. The one or more straps 504 can tear to enable passenger airbag 502 to inflate to a desired size, shape, and volume. Tears 510 in straps 504 enable passenger airbag 502 to extend to an increased size, shape, and/or volume. The desired size, shape, and/or volume can be configured to inflate from dashboard 506 to a seat back of passenger seat 108.

Additionally, or alternatively, one or more straps 504 can comprise a pyrotechnic cutter. The pyrotechnic cutter can be activated in response to a far-side crash event and/or an absence of a passenger in passenger seat 108. The activated pyrotechnic cutter can cut one or more straps 504 at tears 510. Cutting one or more straps 504 enables passenger airbag 502 to inflate to a larger size, shape, and/or volume as compared to inflating passenger airbag 502 with intact one or more straps 504.

Additionally, or alternatively, one or more straps 504 can be configured to extend its length in response to a far-side crash event. One or more straps 504 can comprise other means of tearing or extending to inflate passenger airbag 502 to multiple sizes. For example, the one or more straps 504 can comprise tear seams or other appropriate means known to a person of skill in art.

Figure 7:
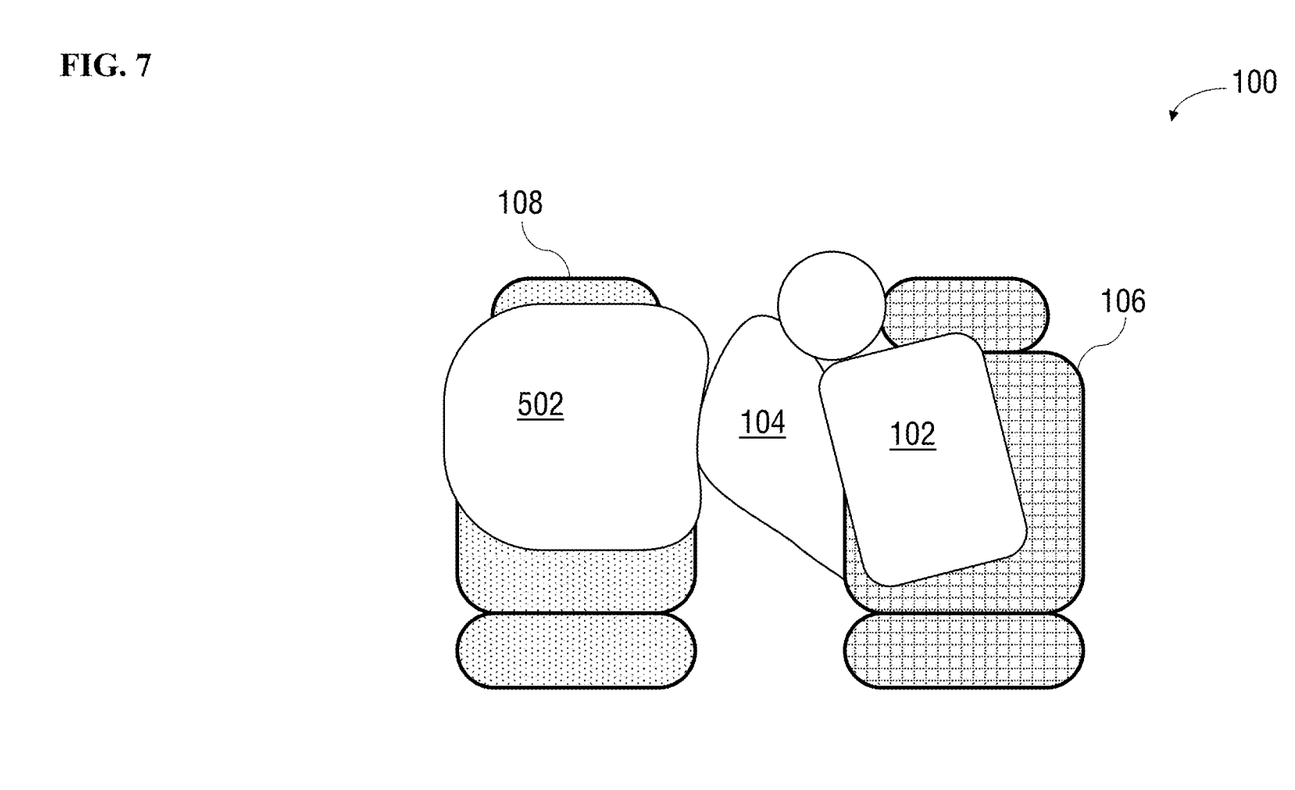
FIG. 7 illustrates a front view of a vehicle interior during a far-side crash event according to at least one example of the disclosure.

FIG. 7 is a front view of vehicle interior 100 during a far-side crash event. In the absence of a passenger in passenger seat 108, passenger airbag 502 can be inflated in the passenger area to provide support for inboard airbag 104. Inboard airbag 104 can be installed on an inboard side of driver seat 106 and inflate in between driver seat 106 and passenger seat 108. Together, passenger airbag 502 and inboard airbag 104 can prevent or reduce far-side excursion of vehicle driver 102.

Vehicle driver 102 may move toward the far-side or passenger area 204 of the vehicle during far-side excursion. As vehicle driver 102 comes into contact with inboard airbag 104, inboard airbag 104 can inhibit the lateral movement of vehicle driver 102.

Passenger airbag 502 can be inflated to a size that fills a portion of passenger area 204 from the dashboard to a seat back of passenger seat 108. Inboard airbag 104 may come into contact with passenger airbag 502 because of a lateral movement of vehicle driver 102. The combination of inflated passenger airbag 502 and inflated inboard airbag 104 can prevent vehicle driver 102 from moving into the passenger area 204 because the volume of passenger airbag 502 occupies a portion of the passenger area which supports inboard airbag 104.

Figure 8:
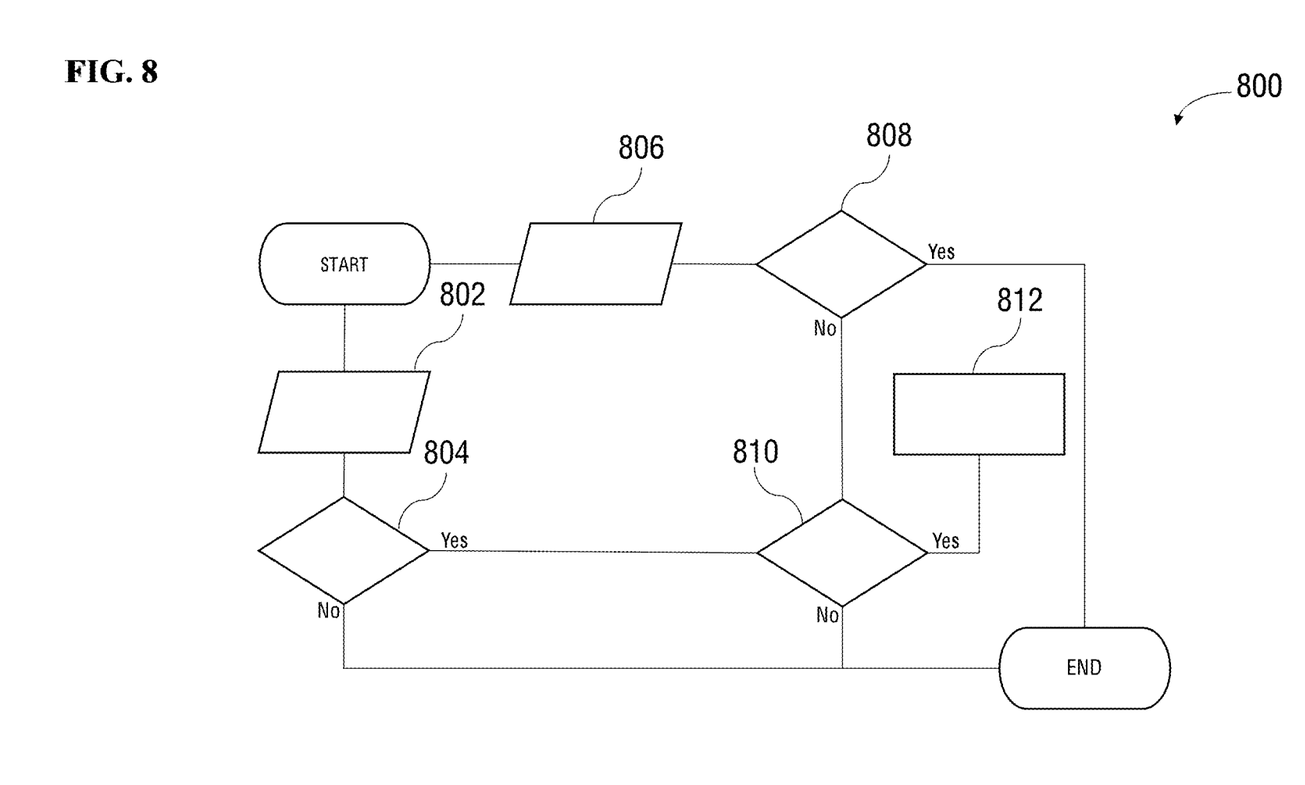
FIG. 8 illustrates a process of deploying an airbag arrangement according to at least one example of the disclosure.

FIG. 8 is a process 800 for a controller of a vehicle airbag system. The controller can receive an output signal from one or more sensors of a vehicle. The vehicle can comprise one or more crash sensors configured to output a signal including crash detection information. The controller can receive the signal with crash detection information at process step 802 and determine whether a crash event is a far-side crash event based on the crash event detection information at process step 804. The vehicle can comprise one or more sensors configured to output a signal including passenger information. The controller can receive the output signal with passenger detection information at process step 806 and determine whether there is a passenger in the passenger seat of the vehicle based on the passenger detection information at process step 808. If the controller determines at process step 810 that there is not a passenger in the passenger seat and that the crash event is a far-side, then the controller can deploy the inboard airbag and the passenger airbag at process step 812.

Additionally, if the passenger airbag comprises an electronically controlled mechanism to tear or expand the passenger airbag straps, process step 812 can further comprise controlling the mechanism to tear or extend the straps. The controller can generate a message or signal to deploy the airbags and control the straps and transmit the message or signal to a further controller.

For example, the controller of process 800 can directly control one or more airbags in the airbag system. Additionally, or alternatively, the controller can indirectly control the one or more airbags in the airbag system by transmitting a control signal to further controller.

If the controller determines that a passenger is present in the vehicle at process step 808, process 800 can end. If the controller determines that the crash event is not a far-side crash event at process step 804, process 800 can end. If the controller determines that only one of the conditions is satisfied at process step 810, process 800 can end. For example, the process can end without deploying both the inboard airbag and the passenger airbag because only one condition is satisfied. Such as when a passenger is not present, but the crash event is a front-end crash event or when the crash event is a far-side crash event, but a passenger is present in the passenger seat.

Figure 9:
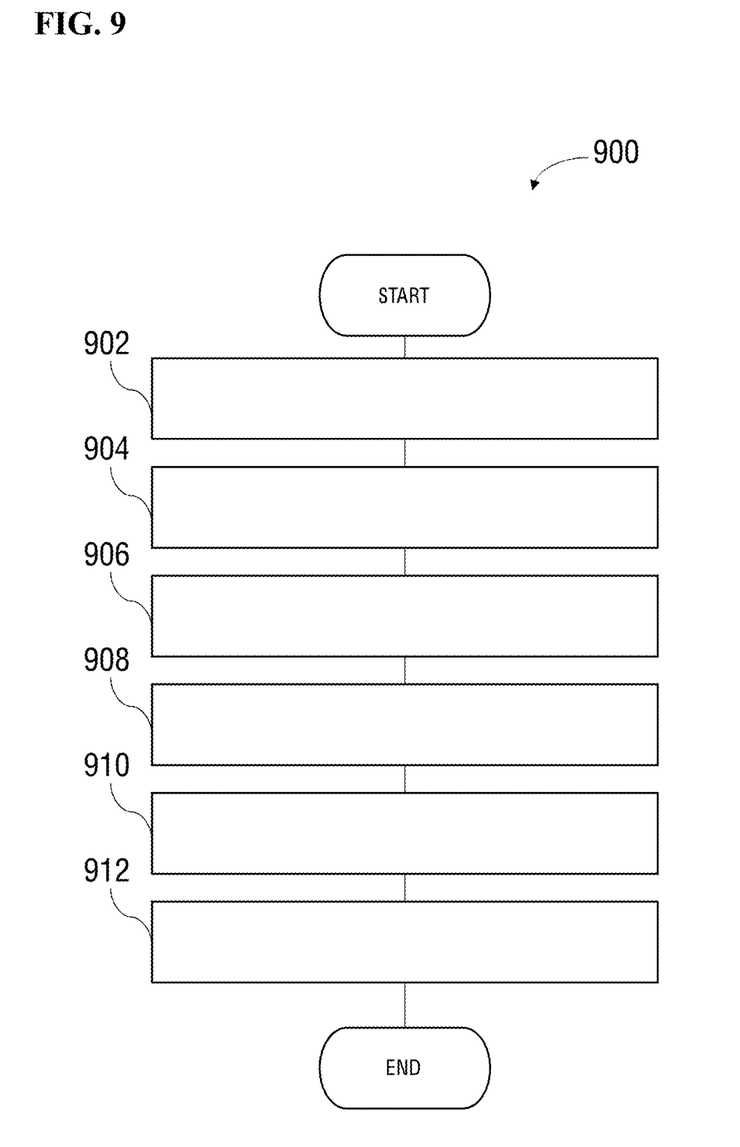
FIG. 9 illustrates a method of deploying an airbag arrangement according to at least one example of the disclosure.

FIG. 9 is a method 900 of deploying an airbag arrangement. Step 902 comprises receiving or obtaining a passenger sensor signal, such as a weight sensor signal, including passenger information. Step 904 comprises receiving or obtaining a sensor signal, such as a crash sensor signal, including crash event information. Step 906 comprises determining whether a passenger is present in a vehicle based on the information included on the received or obtained signal of step 902. Step 908 comprises determining whether a crash event is a far-side crash event based on the information included on the received or obtained signal of step 904. Step 910 comprises deploying an inboard airbag in response to determining that a passenger is absent from step 906 and determining a far-side crash event from step 908. Step 912 comprises deploying a passenger airbag in response to determining that a passenger is absent from step 906 and determining a far-side crash event from step 908. It should be understood that the steps of method 900 are not restricted to the order shown.

Figure 10:
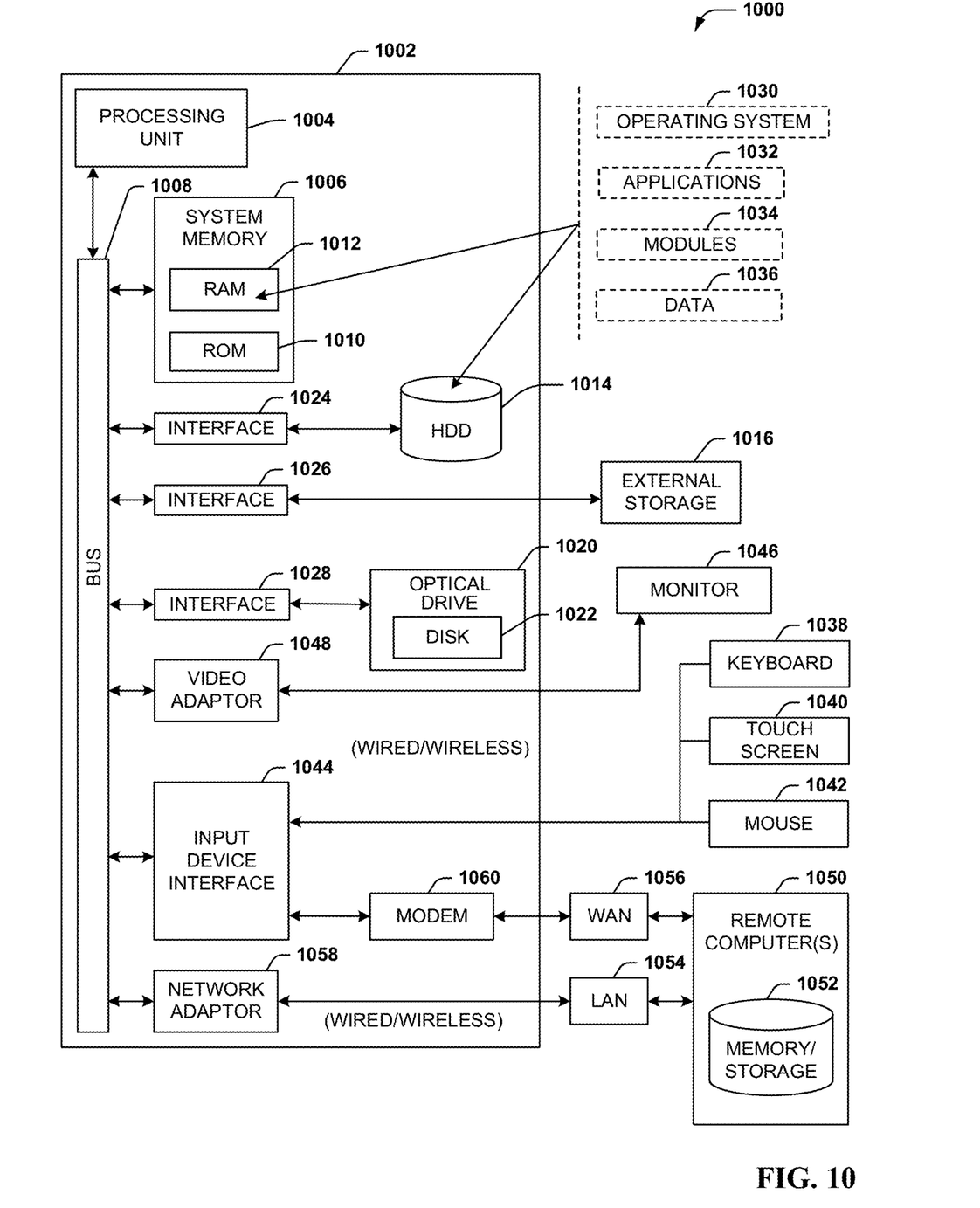
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers (e.g., ruggedized personal computers), field-programmable gate arrays, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media, machine-readable storage media, and/or communications media, which two terms are used herein differently from one another as follows. Computer-readable storage media or machine-readable storage media can be any available storage media that can be accessed by the computer and comprises both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprise any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, optic, infrared, and other wireless media.

With reference again to FIG. 10, the example environment 1000 for implementing various embodiments of the aspects described herein comprises a computer 1002 (e.g., a controller), the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors, field-programmable gate array, AI accelerator application-specific integrated circuit, or other suitable processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data. It is noted that unified Extensible Firmware Interface(s) can be utilized herein.

The computer 1002 further comprises an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a disk 1022 such as a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can comprise at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the NET framework, for applications 1032. Runtime environments are consistent execution environments that allow applications 1032 to run on any operating system that comprises the runtime environment. Similarly, operating system 1030 can support containers, and applications 1032 can be in the form of containers, which are lightweight, standalone, executable packages of software that comprise, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can comprise a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, weights sensors, crash sensors, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically comprises other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1052 is illustrated. The logical connections depicted comprise wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also comprise a wireless access point (AP) disposed thereon for communicating with the adapter 1058 in a wireless mode.

When used in a WAN networking environment, the computer 1002 can comprise a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can comprise Wireless Fidelity (Wi-Fi) and BLUETOOTH® wireless technologies. Thus, the communication can be a predefined structure as with a conventional network or simply an ad hoc communication between at least two devices.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims.

What is claimed is:

1. An airbag arrangement for a vehicle comprising a driver area and a front passenger area, the airbag arrangement comprising:
   a first airbag configured to selectively inflate in the passenger area during a crash event; and
   a second airbag configured to inflate between an inboard side of the driver area and the inflated first airbag during the crash event,
   wherein the first airbag is configured to inflate only when the crash event is determined to be a far-side crash event type from a group of crash event types, and when the first airbag and the second airbag are inflated, the first airbag provides lateral structural support for the second airbag, and the first airbag inhibits a movement of the second airbag into the front passenger area and prevents excursion of a driver from the driver area into the passenger area during the crash event.

2. The airbag arrangement of claim 1, wherein the first airbag is installed in a dashboard of the vehicle.

3. The airbag arrangement of claim 1, wherein the second airbag is installed in an inboard side of a driver seat of the vehicle.

4. The airbag arrangement of claim 1, wherein the first airbag comprises at least one strap, and is configured to selectively inflate to a first volume or a second volume during the crash event, wherein the second volume is larger than the first volume, wherein the first airbag is configured to inflate to a first volume in response to a passenger being present in the front passenger area during the far-side crash event, and inflate to a second volume in response to no passenger being present in the front passenger area during the far-side crash event.

5. The airbag arrangement of claim 4, wherein the at least one strap is configured to release in response to no passenger being present in the front passenger area during the crash event, such that the first airbag inflates to the second volume.

6. The airbag arrangement of claim 4, wherein the at least one strap is configured to release pyrotechnically in response to no passenger being present in the front passenger area during the crash event.

7. The airbag arrangement of claim 1, wherein the first airbag is configured to inflate before the second airbag during the crash event.

8. An airbag system comprising:
   an airbag arrangement for a vehicle comprising a driver area and a passenger area, the airbag arrangement comprising:
      a first airbag configured to selectively inflate in the passenger area during a crash event, and
      a second airbag configured to inflate between an inboard side of the driver area and the inflated first airbag during the crash event,
      wherein the first airbag is configured to selectively inflate during the crash event, and when the first airbag and the second airbag are inflated, the first airbag provides support for the second airbag, and the first airbag inhibits a movement of the second airbag into the front passenger area and prevents excursion of a driver from the driver area into the passenger area during the crash event,
      wherein the first airbag comprises at least one strap and is configured to selectively inflate to a first size or a second size during the crash event, and wherein the second size is longer than the first size;
   a first sensor configured to detect a passenger in the passenger area;
   a second sensor configured to detect a crash event; and
   a controller configured to inflate the first airbag during the crash event, and only inflate the second airbag during the crash event in response to a determination that the crash event is a far-side crash event type from a group of crash event types.

9. The airbag system of claim 8, wherein the controller comprises a processor, and wherein the processor receives a first output from the first sensor and a second output from the second sensor.

10. The airbag system of claim 9, wherein the processor is configured to determine an absence of any passenger in the passenger area during the far-side crash event based on the first output and the controller is further configured to inflate the first airbag to the second size during the far-side crash event in response to the determination of the absence of any passenger in the passenger area during the far-side crash event.

11. The airbag system of claim 10, wherein the at least one strap is configured to release in the absence of any passenger in the passenger area during the far-side crash event, and the first airbag is configured to inflate to the second size to extend from a vehicle dashboard to a passenger seat back.

12. The airbag system of claim 11, wherein the at least one strap is configured to release mechanically in the absence of any passenger in the passenger area during the far-side crash event.

13. The airbag system of claim 9, wherein the processor is configured to determine a presence of the passenger in the passenger area during the far side crash event based on the first output and the controller is further configured to inflate the first airbag to the first size during the far-side crash event in response the determination of the presence of the passenger in the passenger area.

14. The airbag system of claim 8, wherein the inboard side of the driver area does not overlap with the passenger area.

15. An airbag system comprising:
   an airbag arrangement for a vehicle comprising a driver area and a passenger area, the airbag arrangement comprising:

a first airbag configured to selectively inflate in the passenger area during a crash event, and a second airbag configured to inflate between an inboard side of the driver area and the inflated first airbag during the crash event, wherein the first airbag is configured to selectively inflate during the crash event, and when the first airbag and the second airbag are inflated, the first airbag provides support for the second airbag, and the first airbag inhibits a movement of the second airbag into the front passenger area and prevents excursion of a driver from the driver area into the passenger area during the crash event, a first sensor configured to detect a passenger in the passenger area;

a second sensor configured to detect a crash event; and a controller configured to inflate the first airbag during the crash event, and only inflate the second airbag during the crash event in response to a determination that the crash event is a far-side crash event type from a group of crash event types.

16. The airbag system of claim 15, wherein the first airbag is installed in a dashboard of the vehicle.

17. The airbag system of claim 15, wherein the second airbag is installed in an inboard side of a driver seat of the vehicle.

18. The airbag system of claim 15, wherein the first airbag comprises at least one strap, and is configured to selectively inflate to a first size or a second size during the crash event, and wherein the second size is longer than the first size, wherein the first airbag is configured to inflate to a first size in response to a passenger being present in the front passenger area during the far-side crash event, and inflate to a second size in response to no passenger being present in the front passenger area during the far-side crash event.

19. The airbag system of claim 18, wherein the at least one strap is configured to release in response to no passenger being present in the front passenger area during the crash event, such that the first airbag inflates to the second size.

20. The airbag system of claim 18, wherein the controller is further configured to determine, using an output of the second sensor, a crash event type of the crash event from the group of crash event types.

\* \* \* \* \*